United States Patent [19]

Knowles et al.

[11] Patent Number: 4,509,459
[45] Date of Patent: Apr. 9, 1985

[54] PROCESS AND APPARATUS FOR FISH GROWTH ACCELERATION

[76] Inventors: Albert H. Knowles; Robert H. Rines, both of 13 Spaulding St., Concord, N.H. 03301

[21] Appl. No.: 500,349

[22] Filed: Jun. 2, 1983

Related U.S. Application Data

[60] Division of Ser. No. 360,563, Mar. 22, 1982, Pat. No. 4,399,770, which is a continuation of Ser. No. 181,831, Aug. 27, 1980, abandoned.

[51] Int. Cl.³ ............................................. A01K 63/00
[52] U.S. Cl. ....................................................... 119/3
[58] Field of Search ............................................ 119/3

[56] References Cited

U.S. PATENT DOCUMENTS 3,320,928  5/1967  Smith ....................................... 119/3
3,626,901  12/1971  Englesson ............................... 119/3
3,698,359  10/1972  Fremont ................................. 119/3
4,271,788  6/1981  Knowles ................................. 119/3

FOREIGN PATENT DOCUMENTS 1762 of 1901  United Kingdom ..................... 119/3

Primary Examiner—Hugh R. Chamblee
Attorney, Agent, or Firm—Rines and Rines, Shapiro and Shapiro

[57] ABSTRACT

This disclosure is concerned with novel cover arrangements for providing dark stacking and rest areas in confined water volumes for fish growth acceleration, including salmonoids and the like, and involving pluralities of closely spaced covers contacting the water and providing successive dark areas while influencing water circulation by the edges of the covers to swirl feed thereat; forms of these arrangements being adapted both for land-constructed pools or ponds, and confined effective pool or pond volumes in the sea constructed as netted sea cages bordered by floating or exposed walkways and the like.

2 Claims, 3 Drawing Figures

PROCESS AND APPARATUS FOR FISH GROWTH ACCELERATION

This is a divisional application of Ser. No. 360,563, filed Mar. 22, 1982, now U.S. Pat. No. 4,399,770, which is a continuation of Ser. No. 181,831, filed Aug. 27, 1980, now abandoned.

The present invention relates to improvements in water-contacting covers or related light-blocking apparatus for accelerating fish growth, such as of salmonoids and other fish, being more particularly, though not exclusively directed to uses in the larger-size land-based pools or ponds, or sea cages that serve as in situ pools or ponds.

The phenomenon of accelerating fish growth through providing dark rest areas under light-blocking water-contacting covers (floating or submerged) in which the fish may stack, and from which they may observe and momentarily dart out for circulating feed in illuminated regions (preferably extended illumination over 24 hours or so) bordering the dark areas, and wherein they have been found to feed without agitation, competition and disfiguring one another, and with remarkably increased growth over, and in greater densities than obtainable with, equivalent ponds, pools or cages not provided with such water-contacting covers, is described in co-pending U.S. Patent application, Ser. No. 65,617, entitled "PROCESS AND APPARATUS FOR ACCELERATING GROWTH RATE OF SALMONOIDS AND OTHER FISH AND THE LIKE", now U.S. Pat. No. 4,271,788, issued June 9, 1981. As an illustration, salmon parr in ponds so equipped have attained over 100% weight growth increase over a 12-month period over equivalent ponds not so equipped, and with at least a doubling of density of fish in the same pond.

While this system has been found to work admirably well both in fresh water and salt water pools or ponds (where these terms are generically used to embrace also sea-net cages bordered at the surface with exposed or floating walkways or the like), it is sometimes awkward and expensive to construct and to handle and use large-size covers for the larger pools or ponds or cages, (say 10 meters in cross dimension or greater), even if provided with hinged or separable connections. It is to this problem, among others, that the present invention is accordingly directed, it being an object of the invention to provide a new and improved process and apparatus for enabling the effective use of pluralities of relatively small covers in large contained water volumes of such pools, ponds or cages and the like.

A further object is to provide an improved water-contacting cover apparatus particularly useful in sea cages and the like where rough water, icing and other deletereous environmental factors may be present at times.

Still another object is to provide novel cover apparatus for these and related purposes.

Other and additional objects will be explained hereinafter, being more particularly delineated in the appended claims. In summary, from one of its important aspects, the invention embraces a process for accelerating the growth of fish in a contained water volume bounded by a border at least at the surface of the water, that comprises, populating the volume with fish and circulating water in said volume while applying feed thereto; providing a plurality of light-blocking covers each in contact with the water and disposed successively partially to extend along said border and inwardly therefrom to provide successive dark areas along said border for the stacking and resting of the fish in darkness in the successive areas under the successive covers; and the uncovered regions of the water surface exposing the feed circulating past the edges of the covers through said volume to the fish stacked under the covers. Preferred constructional and operational details and best mode embodiments are hereinafter presented.

The invention will now be described in connection with the accompanying drawings, FIG. 1 of which is an isometric view of a preferred embodiment, operating in accordance wih the process of the invention;

FIG. 3 is a similar view of an adaptation particularly suited for sea cage volumes and the like.

Figure 1:
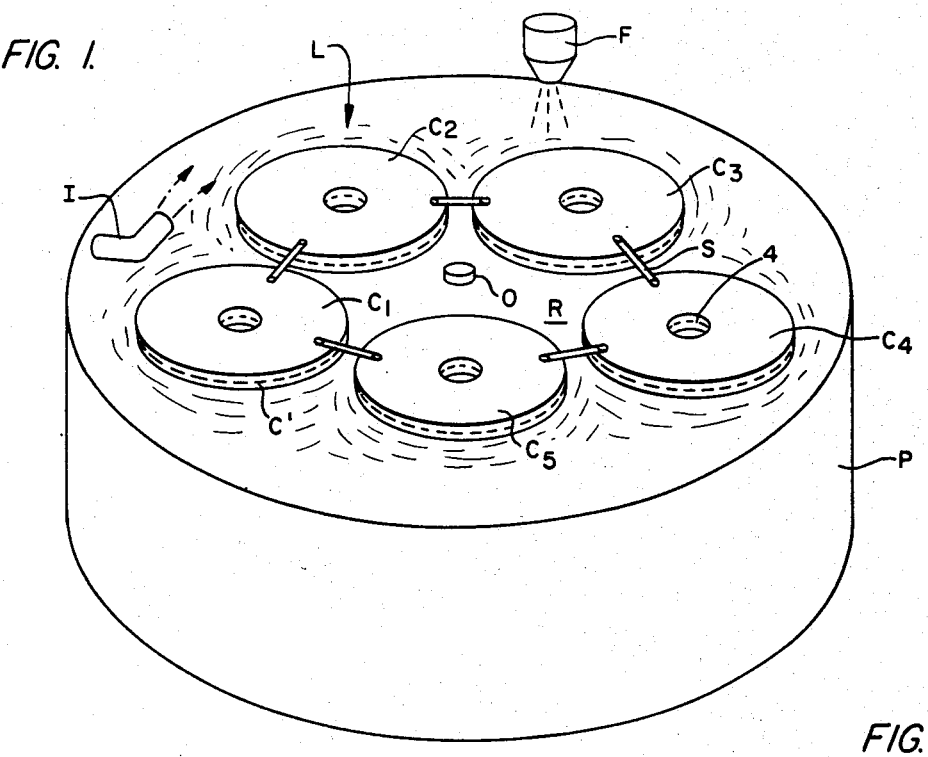

Referring to FIG. 1, a circular pond P, say of about 7 to 10 meters in diameter cross-section, or greater, is shown provided with a plurality (illustrated as five) of similar light-blocking (such as opaque fiberglass, for example) floating covers $C_1$-$C_5$, illustrated as of the generally convex circular type described in said patent application, the peripheral lip edges of which contact the water surface and create the before-mentioned dark, shadow stacking and rest areas thereunder. Inlet water is ejected at angles, as shown at I, to circulate the same around the pond P, exiting at a center generally filtered pipe O, and circulating feed as it drops under gravitational influence from a periodically operated, conventional solenoid shutter control feeder generally shown at F. The feed is observable in the illuminated regions beyond the cover edges (preferably with 24-hour or other extended illumination downwardly directed, as at L), by the fish resting in stacks in the successive dark areas under each of the successively laterally disposed covers $C_1$ through $C_5$. The covers themselves are successively positioned, as by successive straps S, to extend in fixed relative position along the border walls of the pond P, and inwardly therefrom, but preferably somewhat spaced therefrom, as illustrated, to provide illuminated regions along preferably the total periphery of the covers. In addition, the surface tension and water-guiding effect of the cover lips (preferably provided with an inner float-supporting ring as of foam polyurethane or the like, generally indicated at $C^1$), causes deflecting or the circulating of the water current established by the inlet I between the successive spaced covers, as shown by the whirl lines in the drawing, carrying feed therebetween and between the covers and the pool border and serving also to hold the feed up a substantial time before gravity finally takes over.

The convex upper surface of each of the floating covers provides thereunder a varying-dimension air space, increasing towards the center, to assist in keeping the cover clean and enabling fish that may jump out onto the top of the cover, to roll back into the water.

The covers $C_1$-$C_5$ that extend along the inner periphery of the circular pool border are also shown provided with internal lipped smaller-diameter central apertures 4 also contacting the water, and useful as additional illuminated feed regions, but also to enable the individual covers also to be handled and used in smaller ponds where the outlet pipe may extend through such apertures. A further feature of the invention is the relatively still region R of the pond that results from the above construction, as distinguished from the faster circulating region adjacent the pool border walls, and which has been found to keep the feed suspended and promote active feeding as the fish, resting in dark stacks under the covers, dart radially inward to the more quiet illuminated region R and then return to their original positions in the dark resting area under the cover from which they originated. Increasing feeding without agitation has been found to result, as before stated. If desired, moreover, a larger space may be provided between the adjacent covers at the inlet I to accomodate the initial circulating action; but in any event, the spacing from covers to the pool border walls and from cover to cover are preferably small compared with the cover dimensions—indeed, a small fraction thereof.

As an example, salmon parr near the smolt condition, disposed in a 20-foot pond P, with five covers $C_1$-$C_5$, as shown, each about 6½ feet in outer diameter and spaced about 8" from the pool border and from each other, were found, on the average, to weigh up to ten percent more than their counterparts in a similar uncovered pond in only about three weeks in the open, in northern Scotland (May).

Figure 2:
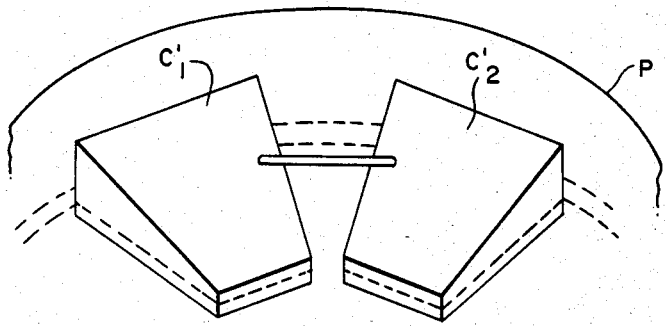
FIG. 2 is a fragmentary view similar to FIG. 1 of a modified structure.

Other shapes, including square, rectangular and other polygonic and curved forms of covers may be used, depending upon the applications; FIG. 2 illustrating, for example, substantially trapezoidal polygonic contour constructions $C^1{}_1$, $C^1{}_2$, etc. floating preferably spaced slightly from the pool border and from each other. The construction is tapered (shown from outer to inner edge of the covers) to provide an increasing air spaced under and across each of the plurality of floating covers from center towards the pool border, and again an inclined upper outer surface for tumbling fish that may have jumped thereupon, back into the pool.

Figure 3:
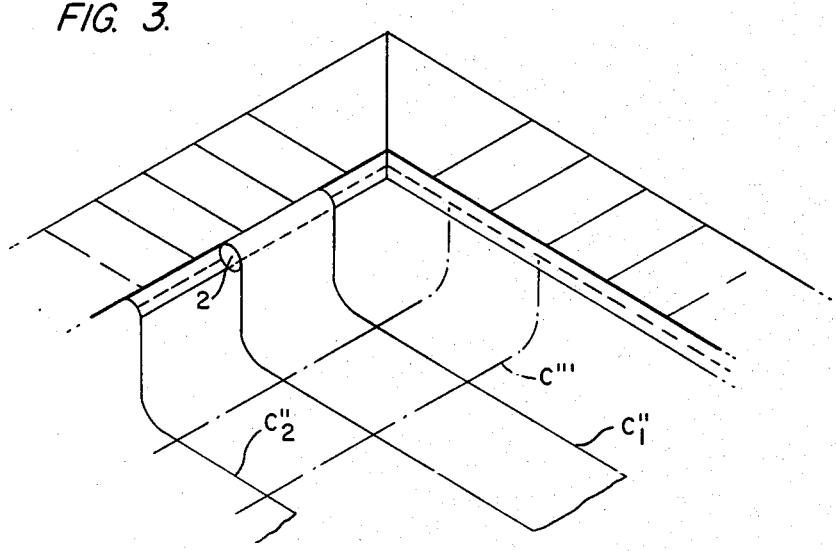

The above and related constructions are well adapted for use both in land-based and water or sea-based contained volumes, the latter usually being contained by nets hung from a surface floating or exposed walkway border and usually referred to as cages, as before mentioned. In connection with such sea cage volumes, where storms, icing and other deleterious environmental factors may come into play, other forms of pluralities of cover—preferably of soft resilient material as of butyl rubber or the like (to avoid fish damage) and preferably submerged under the water surface and extending along the borders of the walkways or the like—may be employed. One illustration thereof is shown in FIG. 3 in the form of successive spaced submerged soft rubber sheets $C_1''$, $C_2''$, etc. hung to extend between opposing rectangular or square walkways or borders and preferably somewhat spaced therefrom, as before discussed. For cleaning or other maintenance, these covers may be withdrawn at one border by conventional means, such as pulleys 2. Orthogonally extending sheet covers $C'''$ may also border the other sides of the walkways, if desired, providing a border covering extending along the inner periphery of the walkway border.

Further modifications will also occur to those skilled in this art and such are considered to fall within the spirit and scope of the invention as defined in the appended claims.

What is claimed is:

1. For use in a contained water volume having a border at least at the water surface and fish contained therein, apparatus comprising the combination of a plurality of elongate, light-blocking cover sheets of soft, resilient material and means for suspending said cover sheets respectively from opposite parts of said border at successive laterally spaced positions along said border and in an arrangement that provides cover sheets that are orthogonal to one another and that provides successive laterally spaced dark areas beneath said cover sheets, wherein the fish may stack and rest in darkness, with intervening light areas corresponding to the spaces between adjacent cover sheets, each of said cover sheets, when suspended, having major portions in the water.

2. The combination of claim 1 and in which the volume border is substantially rectangular or square and the cover sheets are attached for suspension at points along the inner periphery thereof.

* * * * *